United States Patent
Oteri et al.

(10) Patent No.: US 9,215,043 B2
(45) Date of Patent: Dec. 15, 2015

(54) SYSTEMS AND METHODS FOR SCHEDULING AND MU-MIMO IN UPLINK VO-IP FOR OFDMA/SCFDMA NETWORKS

(75) Inventors: Oghenekome Oteri, San Diego, CA (US); Young Hoon Kwon, San Diego, CA (US); Cornelius van Rensburg, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 743 days.

(21) Appl. No.: 12/621,449

(22) Filed: Nov. 18, 2009

(65) Prior Publication Data

US 2010/0128687 A1 May 27, 2010

Related U.S. Application Data

(60) Provisional application No. 61/116,187, filed on Nov. 19, 2008, provisional application No. 61/116,115, filed on Nov. 19, 2008.

(51) Int. Cl.
| | |
|---|---|
| *H04W 72/04* | (2009.01) |
| *H04L 1/18* | (2006.01) |
| *H04L 5/00* | (2006.01) |
| *H04L 29/06* | (2006.01) |
| *H04W 36/06* | (2009.01) |

(Continued)

(52) U.S. Cl.
CPC .......... *H04L 1/1887* (2013.01); *H04L 5/0007* (2013.01); *H04L 5/0037* (2013.01); *H04L 65/1053* (2013.01); *H04L 1/1877* (2013.01); *H04L 5/006* (2013.01); *H04L 5/0085* (2013.01); *H04L 5/0096* (2013.01); *H04W 36/06* (2013.01); *H04W 52/367* (2013.01); *H04W 80/04* (2013.01)

(58) Field of Classification Search
CPC ...... H04W 72/04; H04W 52/02; H04L 12/66; H04L 1/18
See application file for complete search history.

(56) References Cited

U.S. PATENT DOCUMENTS 6,643,272 B1 * 11/2003 Moon et al. .................... 370/311
2003/0053426 A1 * 3/2003 Tsunehara et al. ............. 370/318

(Continued)

FOREIGN PATENT DOCUMENTS

| CN | 1780255 A | 5/2006 |
|---|---|---|
| CN | 101154988 A | 4/2008 |

(Continued)

OTHER PUBLICATIONS

"E-UTRA Performance Checkpoint: VoIP," R1-071959, TSG-RAN WG1 Telephone Conference, Ericsson, Apr. 23-24, 2007, 2 pages.

(Continued)

*Primary Examiner* — Anez Ebrahim
(74) *Attorney, Agent, or Firm* — Slater & Matsil, L.L.P.

(57) ABSTRACT

A system and method for increasing the capacity of VoIP transmissions is disclosed. A preferred embodiment comprises fixing original transmissions into a frequency band and changing the retransmissions into separate frequency bands. Alternatively, the original transmissions may be changed into separate bands while the retransmissions may be fixed into a single frequency band. Additionally, an early termination procedure may be utilized and a combination of multi-input multi-output scheduling may be performed to further increase the capacity of the system. Another embodiment comprises reducing the overhead of a feedback signal for semi-persistent scheduling.

10 Claims, 7 Drawing Sheets

(51) Int. Cl.
H04W 52/36 (2009.01)
H04W 80/04 (2009.01)

(56) References Cited

U.S. PATENT DOCUMENTS

| | | | | |
|---|---|---|---|---|
| 2005/0020213 | A1* | 1/2005 | Azman et al. | 455/67.11 |
| 2005/0190770 | A1* | 9/2005 | Saniee et al. | 370/395.4 |
| 2005/0286408 | A1* | 12/2005 | Jin et al. | 370/208 |
| 2006/0084475 | A1* | 4/2006 | Ohkubo et al. | 455/562.1 |
| 2007/0086406 | A1 | 4/2007 | Papasakellariou | |
| 2007/0086422 | A1* | 4/2007 | Kim et al. | 370/349 |
| 2007/0091787 | A1* | 4/2007 | Kwon et al. | 370/208 |
| 2007/0117537 | A1* | 5/2007 | Hui et al. | 455/405 |
| 2007/0223430 | A1* | 9/2007 | Desai et al. | 370/338 |
| 2007/0298809 | A1* | 12/2007 | So | 455/452.1 |
| 2008/0139212 | A1* | 6/2008 | Chen et al. | 455/450 |
| 2008/0187063 | A1* | 8/2008 | Yu et al. | 375/260 |
| 2009/0005104 | A1* | 1/2009 | Wang et al. | 455/522 |
| 2009/0238120 | A1* | 9/2009 | Cai et al. | 370/329 |
| 2010/0085927 | A1* | 4/2010 | Torsner et al. | 370/329 |

FOREIGN PATENT DOCUMENTS

| | | |
|---|---|---|
| EP | 1976174 A1 | 10/2008 |
| WO | WO 2007/109634 A1 | 9/2007 |

OTHER PUBLICATIONS

"E-UTRA Performance Verification: VoIP (Revision of R1-071971)," R1-072564, 3GPP TSG RAN WG1, Meeting #49, Samsung, Kobe, Japan, May 7-11, 2007, 10 pages.
"LTE Physical Layer Framework for Performance Verification," R1-070674, 3GPP TSG-RAN1 #48, Orange et al., St. Louis, Missouri, Feb. 12-16, 2007, 21 pages.
"LTE System Performance—UL VoIP," R1-071974, 3GPP TSG RAN1 Teleconference, Motorola, Apr. 23-24, 2007, 7 pages.
"OFDM Exponential Effective SIR Mapping Validation, EESM Simulation Results for System-Level Performance Evaluations, and Text Proposal for Section A.4.35 of TR 25.892," R1-Apr. 0089, 3GPP TSG-RAN-1/TSG-RAN-4 Ad Hoc, Nortel Networks, Espoo, Finland, Jan. 27-30, 2004.
"Performance Evaluation Checkpoint: VoIP Summary," R1-072570, 3GPP TSG-RAN WG1 #49, Rapporteur (Motorola), Kobe, Japan, May 2007, 6 pages.
"UL Virtual MIMO Scheduling," R1-051423, 3GPP TSG-RAN1, Meeting #43, Nortel, Seoul, Korea, Nov. 7-11, 2005, 7 pages.
"Uplink Scheduling for VoIP," R2-070476, 3GPP TSG-RAN WG2, Meeting #57, Nokia, St. Louis, Missouri, Feb. 12-16, 2007, 15 pages.
Jiang et al., "Principle and Performance of Semi-Persistent Scheduling for VoIP in LTE System," International Conference on Wireless Communications, Networking and Mobile Computing, Sep. 21-25, 2007, pp. 2861-2864.
Jiang et al., "Uplink VoIP Performance in E-UTRAN TDD Mode," IEEE Conference on Vehicular Technology, May 11-14, 2008, pp. 2482-2486.
Kim, "An Efficient Scheduling Scheme to Enhance the Capacity of VoIP Services in Evolved UTRA Uplink," Proceedings of the International MultiConference of Engineers and Computer Scientists, vol. II, IMECS 2008, Hong Kong, Mar. 19-21, 2008, 7 pages.
Quintero, "Advanced Power Control for UTRAN LTE Uplink," Master of Science Thesis, Department of Electronic Systems, Aalborg University, Jun. 19, 2008, 95 pages.
Wang et al., "Uplink Capacity of VoIP on LTE System," Proceedings of the Asia-Pacific Conference on Communications, Oct. 18-20, 2007, pp. 397-400.
International Search Report regarding International Patent Application No. PCT/CN2009/075045 dated Feb. 25, 2010, 3 pages.
Written Opinion of the International Searching Authority regarding International Patent Application No. PCT/CN2009/075045 dated Feb. 25, 2010, 6 pages.
Barber. et al., "VoIP Enhancements for OFDMA Systems," (113 pages), Huawei Technologies, May 2008.
Ericsson, "Intra-cell Uplink Power Control for E-UTRA—Control Channel Performance Evaluation," TSG-RAN WG1 #47bis, R1-070476, Jan. 15-19, 2007, Sorrento, Italy, 5 pages.
Love, David J. et al., "Limited Feedback Unitary Precoding for Spatial Multiplexing Systems," IEEE Transactions on Information Theory, Aug. 2005, vol. 51, Issue 8, 10 pages.

* cited by examiner

SYSTEMS AND METHODS FOR SCHEDULING AND MU-MIMO IN UPLINK VO-IP FOR OFDMA/SCFDMA NETWORKS

This application claims the benefit of U.S. Provisional Application No. 61/116,187, filed on Nov. 19, 2008, entitled "System and Method of Scheduling of VoIP Traffic in SC-FDMA/OFDMA Uplink Networks," and U.S. Provisional Application No. 61/116,115, filed on Nov. 19, 2008, entitled "Systems and Methods for Mu-MIMO in Uplink VoIP for OFDMA/SCFDMA Networks," which applications are hereby incorporated herein by reference.

TECHNICAL FIELD

The present invention relates generally to a system and method for Voice over Internet Protocol (VoIP) networks and, more particularly, to a system and method for scheduling VoIP transmissions.

BACKGROUND

Voice over Internet Protocol (VoIP) is fast expanding beyond the confines of computer-to-computer voice discussions and into the realm of wireless networks and cell-phone communications. Using a VoIP system, analog voice signals are converted into digital data packets and are then transmitted to their destination, such as a cell phone. However, the normal methods of transmitting packets of data may not be suitable for use in VoIP transmissions because of the unique requirements of a VoIP system, such as the need for a consistent orthogonality across the transmissions when scheduled in pairs in the same resource coupled with the delay constraints due to voice traffic. Without such a delay minimization, a conversation across a VoIP network may be interrupted and noticed by the user.

Additionally, as with almost everything related to networks, the capacity, or bandwidth required by VoIP transmissions becomes an issue. In general, the VoIP capacity can be seen as the maximum number of user equipments (UEs) that can be supported in a network so that no more than a specific number of users (for example 95%) are in outage with a defined packet loss limit (for example less than 2%) and a specific transmission delay limit (for example of less than 50 msec). To maximize this capacity, the area of scheduling the transmissions has seen much research.

This research has generally focused on two methods of scheduling: Persistent Scheduling (PS) and Semi-Persistent Scheduling (SPS). With persistent scheduling, a time-frequency resource for the original transmission is pre-allocated once for the entire voice burst, and this pre-allocation is generally defined by an applicable standard. Subsequent transmissions of the voice burst which might be needed if the original transmission is, for example, lost, are generally performed using a Hybrid Automatic Repeat reQuest (HARQ), which in a PS scheme is also predefined with a time-frequency resource using an applicable standard.

With a SPS scheme, the original transmission generally remains predefined, similar to the PS scheme. The retransmissions, however, are generally allocated dynamically just before the retransmission. As such, while the original transmission remains persistent, the retransmissions are performed more dynamically, such that it is semi-persistent. A SPS scheme, however, while being less restrictive than the PS scheme, also requires a much greater amount of overhead than the PS scheme in order to dynamically allocate resources.

One disadvantage of the prior art is that it does not deal with capacity loss that occurs from signals that terminate early but are in a PS scheme, thereby wasting the time between the early termination of a signal and the time before the end of the time-frequency resource. Another shortcoming is that a SPS scheme along with a multiple user-multiple input multiple output (MU-MIMO) does not separate the need for single-user receivers such as, for example, maximum ratio combining (MRC) spatial schedulers, minimum mean square error (MMSE) schedulers, and interference rejection combining schedulers, for retransmission. Additionally, conventional hybrid SPS/PS solutions do not address the statistical use of MU-MIMO to resolve collisions and increase system capacity.

What is needed, then, is a method and system that overcomes these shortcomings in the prior art.

SUMMARY OF THE INVENTION

These and other problems are generally solved or circumvented, and technical advantages are generally achieved, by preferred embodiments of the present invention which provide for a system and method of transmitting VoIP signals through a wireless network.

In accordance with a preferred embodiment of the present invention, a method for scheduling VoIP signals comprises scheduling a transmission of a first packet of VoIP information and scheduling a retransmission of the first packet of VoIP information, wherein one of the transmission or retransmission is scheduled along a pre-defined resource and the other one of the transmission or retransmission is scheduled along a changing, defined resource.

In accordance with another preferred embodiment of the present invention, a method for scheduling VoIP signals comprises assigning a first maximum number of retransmissions to a plurality of user equipments services by a base station, the assigning being performed by the base station. A prediction of whether each one of the plurality of user equipments utilizes all of the retransmissions allowed is performed by the base station. A second maximum number of retransmissions is assigned by the base station to at least one of the plurality of user equipments, the second maximum number of retransmissions being less than the first maximum number of retransmissions.

In accordance with yet another preferred embodiment of the present invention, a method for scheduling VoIP signals comprises scheduling a first user equipment into a frequency band by itself and scheduling a second user equipment and a third user equipment into a single frequency band, wherein the first user equipment, the second user equipment and the third user equipment are all transmitting to a single base station.

In accordance with yet another preferred embodiment of the present invention, a method of scheduling VoIP signals comprises scheduling a transmission of a packet of VoIP information from a user equipment using a multi-user multiple input multiple output scheduling scheme and scheduling a retransmission of the packet of VoIP information from the user equipment, wherein the retransmission is scheduled with a multi-user multiple input multiple output scheduling scheme other than maximum ratio combining.

In accordance with yet another preferred embodiment of the present invention, a method for scheduling VoIP signals comprises scheduling a transmission of a first packet of VoIP information from a first user equipment in a semi-persistent scheduling scheme, and assigning the first user equipment a defined time period in which to retransmit. A feedback signal is sent to the first user equipment after failing to receive the first packet of VoIP information, the feedback signal including information on the resource to be used to avoid collisions but not including the time period in which to retransmit.

An advantage of a preferred embodiment of the present invention is an increase in the capacity of the network, thereby allowing more user equipment to be processed through individual base stations.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method to allocate time and frequency resources to users in a network in a persistent way which is particularly suitable to traffic such as VoIP packets. The invention may also be applied, however, to other scheduling allocations.

Figure 1:
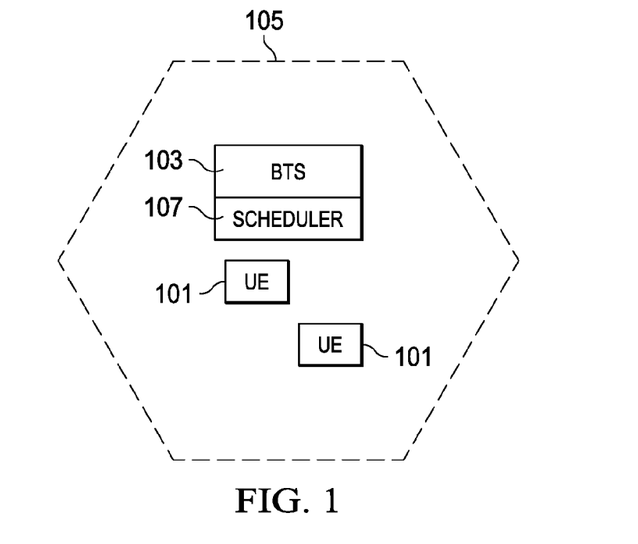
FIG. 1 illustrates a single network with a base station and user equipment in accordance with an embodiment of the present invention.

With reference now to FIG. 1, there is shown a wireless communications network which preferably comprises a base station (BTS) 103, such as an enhanced node base (eNB), providing voice and/or data wireless communication service to a plurality of User Equipments (UEs) 101, such as mobile stations. The BTS 103, which may also be referred to by other names such as access network (AN), access point (AP), Node-B, etc., preferably downlink (DL) information to the UEs 101 while also receiving uplink (UL) information from the UEs 101.

The BTS 103 preferably has a corresponding coverage area 105. This coverage area 105 represents the range of the BTS 103 to adequately transmit data, and, while not necessarily shown in FIG. 1, the coverage areas 105 of adjacent BTSs 103 preferably have some overlap in order to accommodate handoffs between BTSs 103 whenever a UE 101 exits one coverage area 105 and enters an adjacent coverage area 105. Each BTS 103 also preferably includes a scheduler 107 for allocating radio resources to the UEs 101.

Preferably, the wireless communications network includes, but is not limited to, an orthogonal frequency division multiple access (OFDMA) network such as the downlink of an Evolved Universal Terrestrial Radio Access (E-UTRA) network, an Ultra Mobile Broadband (UMB) network, or an IEEE 802.16 network or a single carrier frequency division multiple access (SCFDMA) network such as the uplink of an Evolved Universal Terrestrial Radio Access (E-UTRA) network. However, as one of ordinary skill in the art will recognize, the listed networks are merely illustrative and are not meant to be exclusive. Any suitable multiple access scheme network, such as a frequency division multiplex access (FDMA) network wherein time-frequency resources are divided into frequency intervals over a certain time interval, a time division multiplex access (TDMA) network wherein time-frequency resources are divided into time intervals over a certain frequency interval, a code division multiplex access (CDMA) network wherein resources are divided into orthogonal or pseudo-orthogonal codes over a certain time-frequency interval, or the like may alternatively be used.

The BTS 103 preferably sends and receives voice traffic to and from the UEs 101 using packets of information. The packets may have a fixed size of, for example, 40 bytes, and new packets may be sent at specified intervals, such as every 20 msec. However, because packets of information may be lost or otherwise unusable or undecodable during transmission, retransmissions of an individual packet of information may sometimes be required. The amount of packet loss during transmission of the packets of information is preferably no greater than about 2%, as a greater loss would impact the quality of the voice sent through the packets of information.

The BTS 103 preferably decodes each packet of information received from the UEs 101. The BTS 103 preferably is able to decode each packet of information received from the UE 101 in 50 msec or less. Any longer lag time in decoding would probably not satisfy the user of the UE 101, which can detect errors and lag if the delay exceeds approximately a 200 msec mouth-to-ear delay.

Figure 2:
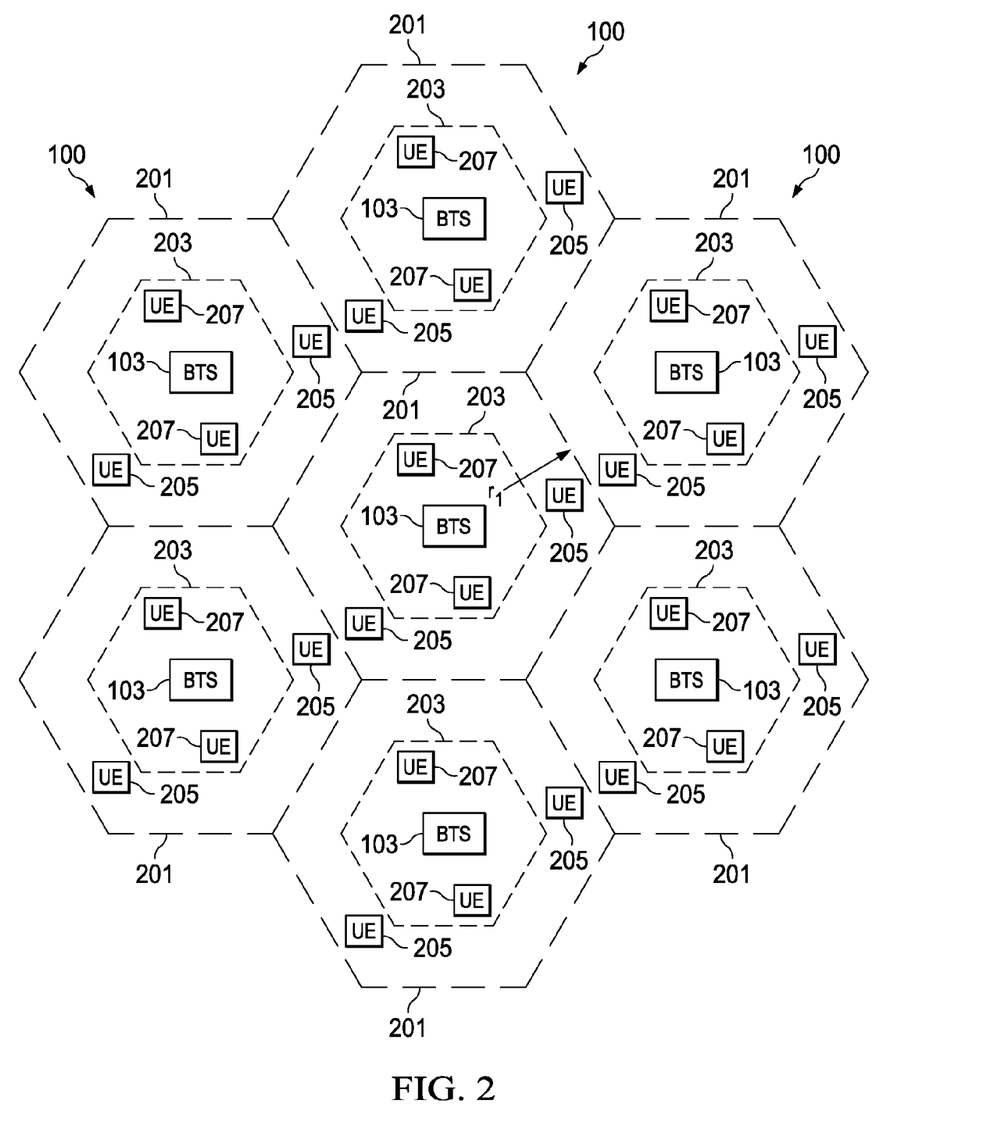
FIG. 2 illustrates multiple networks with edge regions and center regions in accordance with an embodiment of the present invention.

FIG. 2 illustrates a plurality of networks 100, wherein each network comprises a BTS 103. As shown, each BTS 103 has an effective range $r_1$, within which it can effectively transmit and receive signals from the various UEs 101 located within the range $r_1$. The further away from the BTS 103 a UE 101 is located, the more power it requires to successfully transmit its signals to the BTS 103. However, the more power that is used to transmit the signal, the more interference that the UE 101 will generate in an adjacent network 100, thereby driving an adjacent network's signal to noise ratio (S/N) down and interfering with the overall performance of the adjacent network 100. As such, the range $r_1$ of each BTS 103 may be subdivided into edge regions 201 that contain UEs having relatively low S/Ns and center regions 203 having UEs with relatively high S/Ns. While the actual threshold to distinguish between edge S/Ns and central S/Ns may vary depending upon many factors, the threshold preferably may range from about the 0 percentile and about the $40^{th}$ percentile, such as about 5%.

As illustrated, UEs 101 that have a relatively low S/N may be located within the edge region 201 and may be referred to as edge UEs 205. Conversely, UEs 101 that have a relatively high S/N may be located within the central region 203 and may be referred to as center UEs 207. The edge UEs 205, because of their distance away from the BTS 103, typically are less successful in transmitting packets of information to the BTS 103 than center UEs 207.

Figure 3:
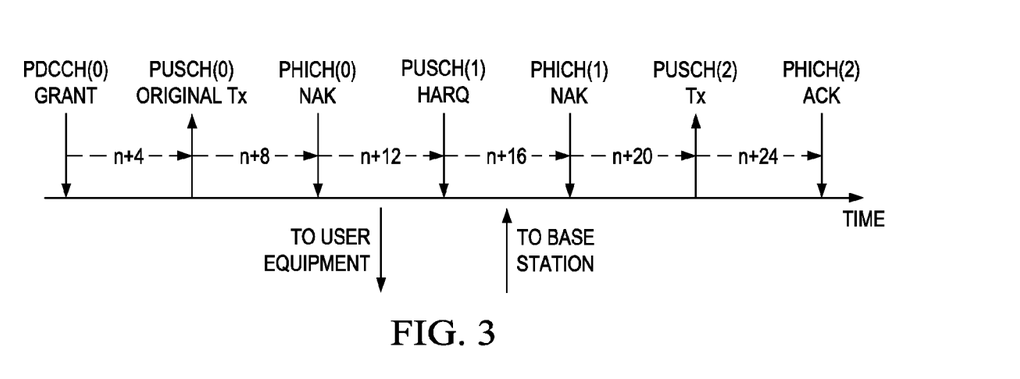
FIG. 3 illustrates steps in the transmission of a packet of information from the user equipment to the base station in accordance with an embodiment of the present invention.

FIG. 3 illustrates preferred steps in the transmission of a packet of information from any of the UEs 101 to the BTS 103 as these steps relate to time. As illustrated, the BTS 103 initially sends a control signal, for example the Physical Downlink control channel (PDCCH) in E-UTRA, to the UE 101 at subframe n to begin transmission. The UE 101 responds a predetermined time, such as about four subframes, after receiving the grant by sending the original transmission to the BTS 103 using a physical uplink shared channel (PUSCH). If the original transmission is not received, the BTS 103 sends a first negative acknowledgement (NAK) feedback signal back to the UE 101 using, for example, a physical hybrid indicator channel (PHICH). The first NAK is followed by a Hybrid Automatic Repeat reQuest (HARQ) from the BTS 103 to the UE 101 and a second NAK along the PHICH from the BTS 103 to the UE 101.

After receiving the HARQ from the BTS 103, the UE 101 retransmits the packet of information at the determined time (e.g., 4 subframes after the second NAK is received), and using the PUSCH. As illustrated, if the first retransmission is successful, the BTS 103 will respond to the first retransmission by sending an acknowledgement signal (ACK) back to the UE 101 along a PHICH.

However, while only a single retransmission of the original message is illustrated in FIG. 3, this is merely exemplary, as any number of errors may occur during transmission of the original packet of information and any subsequent retransmissions. As such, the first retransmission may be compromised as well, and a second retransmission may be needed to successfully transmit the packet of information. Any number of retransmissions may be needed, and all of these retransmissions are fully intended to be included within the present invention.

Figure 4A:
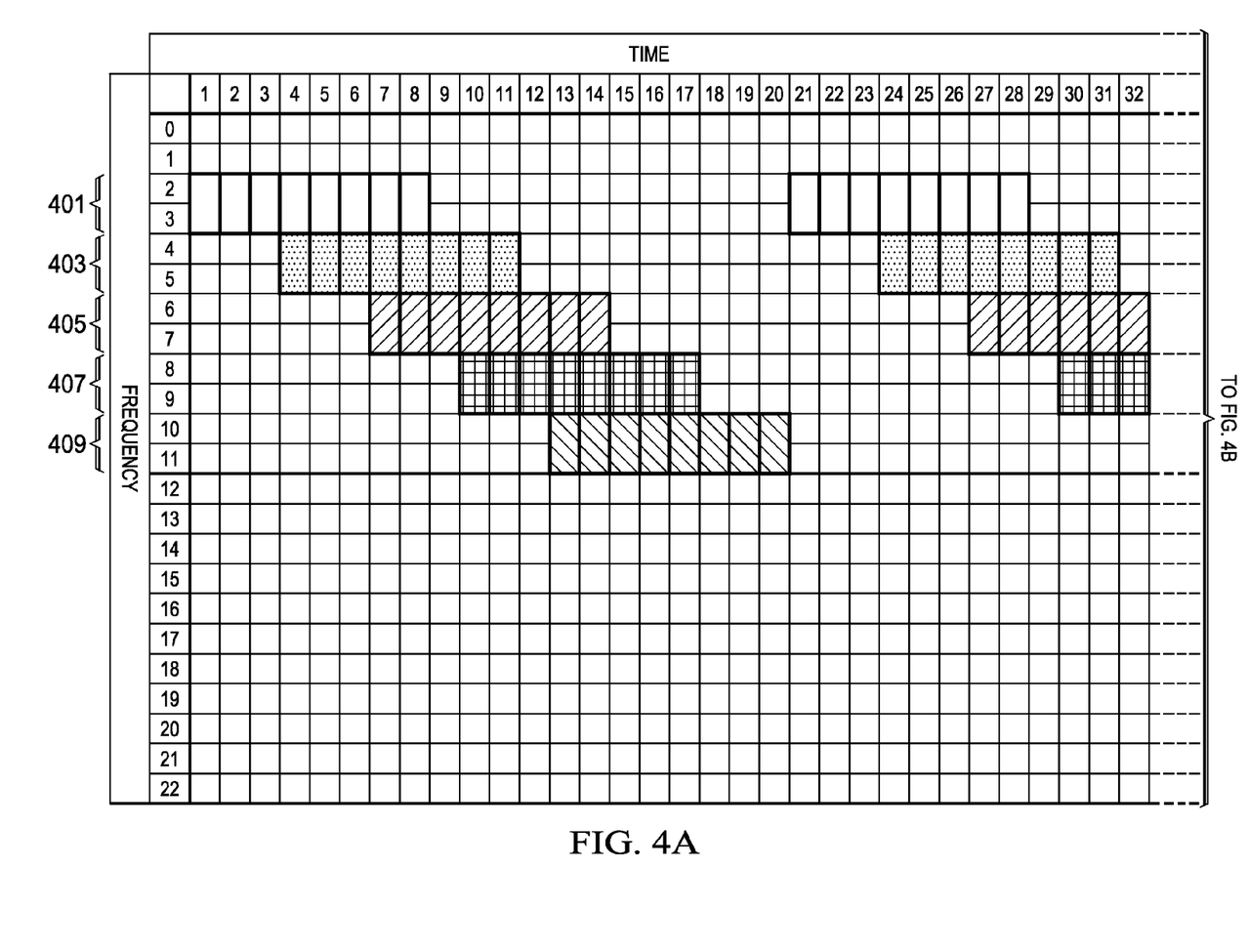
FIG. 4 illustrates a resource block diagram with a pre-defined original transmissions and variable retransmissions in accordance with an embodiment of the present invention.
Figure 4B:
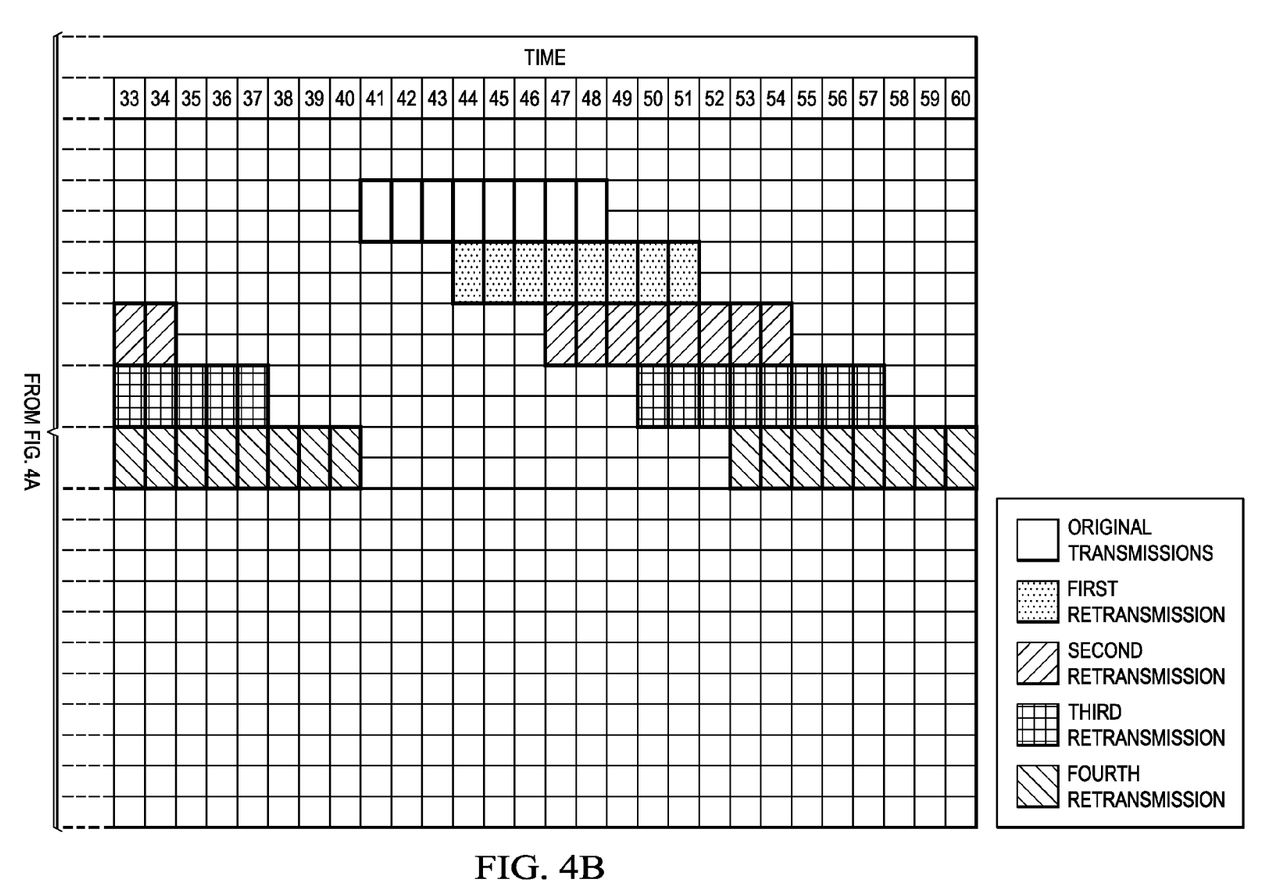

FIG. 4 illustrates a resource block (RB) diagram, wherein each RB is a convergence of a frequency band and a time period, that illustrates first transmissions 401, second transmissions 403, third transmissions 405, fourth transmissions 407, and fifth transmissions 409 from eight separate EUs 101 to the BTS 103. As an example only, the RB diagram shown in FIG. 4 illustrates 25 total RBs, of which four (0, 1, 23, and 24) are control RBs, a retransmission interval of 8 msec, and a maximum number of retransmissions of 6. During transmission, each UE 101 may be allocated at least one RB, such as two RBs, per transmission in order to transmit a packet of information. Finally, FIG. 4 only illustrates 60 msec of time, allowing for three original transmissions from each UE 101 using frequency bands 2-3 with a persistence interval of 20 msec. All of these parameters, however, are only meant to be illustrative only, as any of these parameters may be changed to alternative amounts and still remain within the scope of the present invention.

As illustrated, in an embodiment of the present invention the first transmissions 401 (represented in FIG. 4 by the white blocks) from each of the EUs 101 are preferably persistent and fixed to transmit in two frequency bands, such as frequency bands 2-3. In other words, all of the original, first transmissions 401 are fixed into the same frequency bands and may be transmitted sequentially with one UE transmitting an original message directly behind an original transmission from another UE (as represented by the eight white blocks in frequency bands 2-3 and time periods 1-8).

However, the second transmissions 403, or the first retransmission (which are separately represented in FIG. 4 by differently patterned blocks), are preferably allocated into a separate band from the first transmissions 401, such as frequency bands 3-4, thereby changing the frequency band from the first transmission 401 into another defined band. As such, none of the second transmissions 403 interfere with the original, first transmissions 401 that are located in frequency bands 2-3. Additionally, the third transmission 405 are preferably scheduled into a separate frequency band, such as frequency bands 6-7 than the second transmissions 403, the fourth transmissions 407 are preferably scheduled into a separate frequency band, such as frequency bands 8-9, than the third transmission 405, and the fifth transmissions 409 are preferably scheduled into a separate frequency band, such as frequency bands 10-11, than the fourth transmissions 407. This cycle may then be repeated every 20 msec, at which time the UEs 101 begin transmitting their next packet of information.

This process of reallocating each retransmission into a separate defined band from the previous transmission may be repeated until all of the usable bands have been utilized. As such, the number of retransmissions may be limited by the number of available bands. However, the transmission limit is only limited by the amount of bandwidth, and an increase in frequency bands may supply any desired increase in retransmissions.

By separating the second transmissions 403 into separate frequency bands than the first transmissions 401 (and the third transmissions 405 into separate frequency bands than the second transmissions 403, etc.), the first transmission signaling may be reduced, allowing for a larger number of UEs 101 to send first transmissions 401 without colliding in the same frequency bands with the retransmissions from other UEs 101. As such, the capacity of a VoIP system utilizing a persistent transmission, changing retransmission allocation scheme can be calculated based upon the equation:

$$VoIPCap = \left\lfloor \frac{Total\_RBs - Control\_RBs}{RBs\_per\_UE \times Max(reTx)} \right\rfloor \times PersistenceInterval$$

Using this equation, the RB diagram in FIG. 4 gives a baseline VoIP capacity of 20 UEs for this embodiment of the present invention.

Figure 5A:
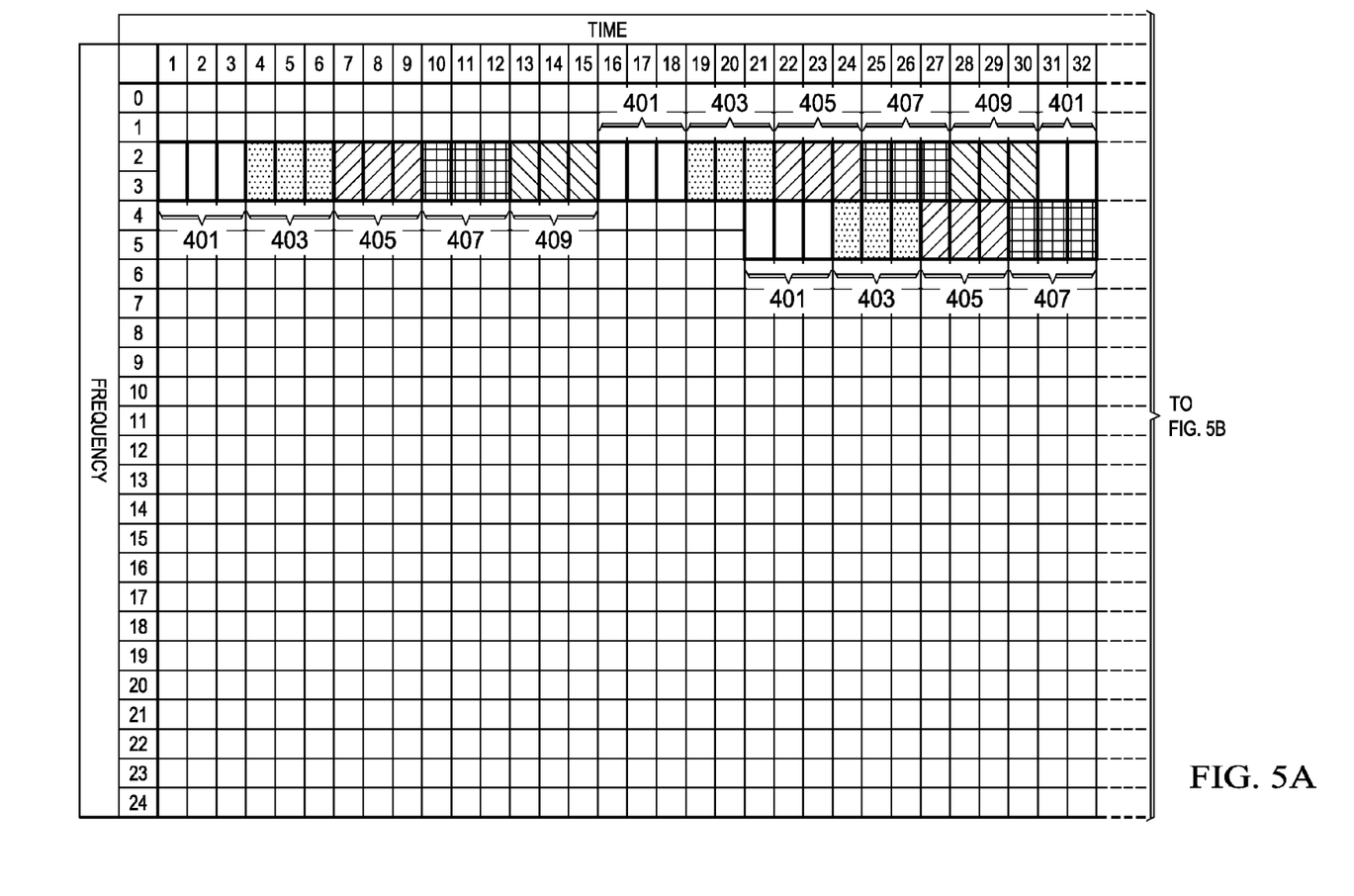
FIG. 5 illustrates a resource block diagram with variable original transmissions and pre-defined retransmissions in accordance with an embodiment of the present invention.
Figure 5B:
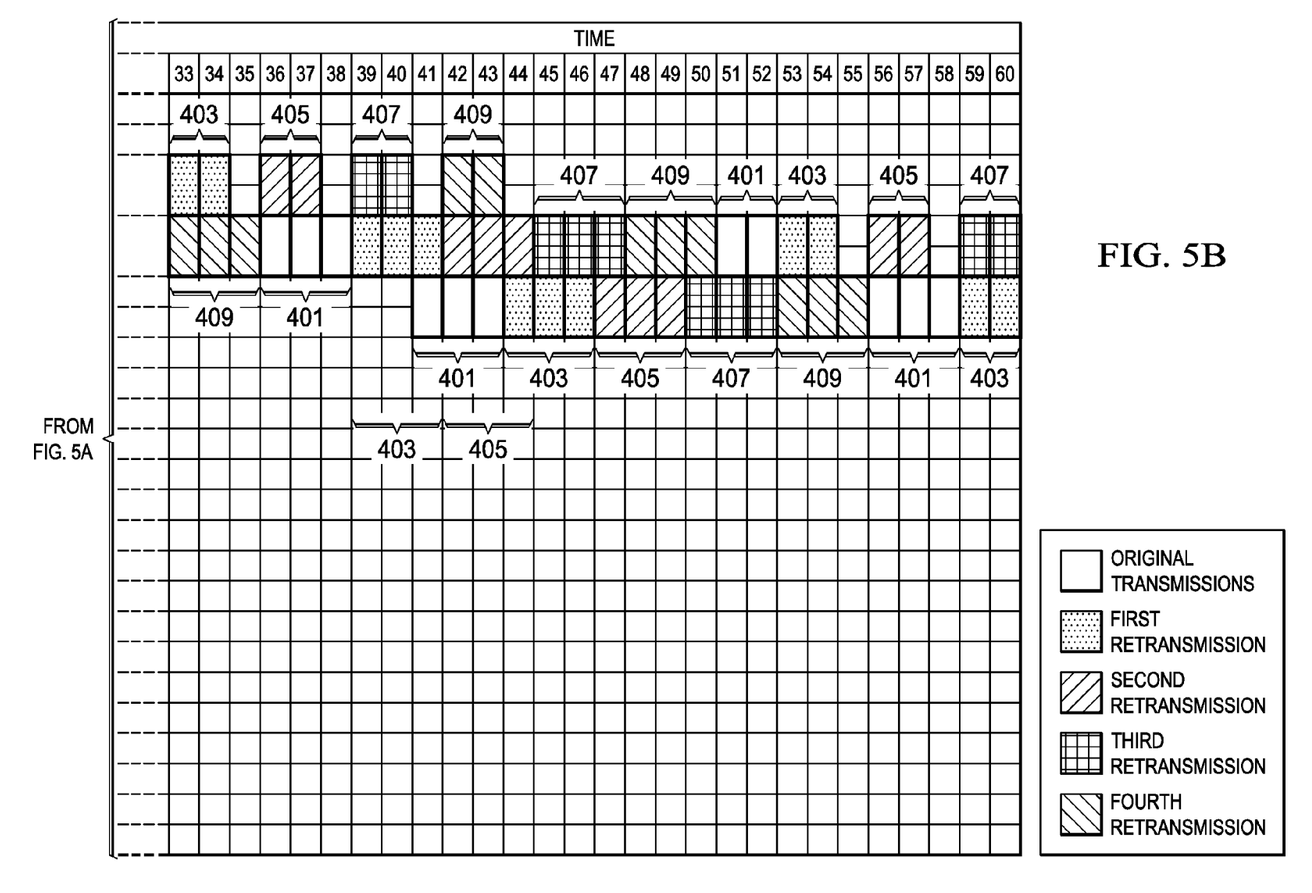

FIG. 5 illustrates an alternative embodiment in which the second transmissions 403, third transmissions 405, fourth transmissions 407, and fifth transmissions 409 are fixed into the same bands as the first transmissions 401, but new original transmissions (i.e., the next packet of information to be sent from the individual UEs 101) from the separate UEs 101 may be changed into separate bands each time an original transmission is sent. In other words, each of the UEs 101 transmit a first original packet of information and all of its retransmissions into the same band, such as frequency bands 2-3. Then, upon the next first transmission 403 of a separate packet of information (shown in FIG. 5 as beginning at time period 21), each of the UEs 101 transmit in a separate frequency band, such as frequency bands 4-5, thereby freeing up the first band of frequencies to complete all of the retransmissions (e.g., the second transmissions 403, third transmissions 405, fourth transmissions 407, and fifth transmissions 409) from the first transmissions 401.

In this embodiment, if there are large number of UEs 101, such as eight UEs, that need to transmit first transmissions 401, then a subset of the UEs 101, such as three UEs transmit their first transmissions and then proceed to transmit their second transmissions 403, third transmissions 405, fourth transmissions 407, and fifth transmissions 409, prior to the remaining five of the UEs 101 begin transmitting their first transmissions 401. However, while illustrative, this subset of three is not limiting, and any number of UEs 101, including all of the UEs 101, may transmit their first transmissions 401 prior to the second transmissions 403 beginning.

By switching the frequency bands of the original transmissions, the VoIP capacity can be calculated using the following equation:

$$VoIPCap = \left\lfloor \frac{\left\lfloor \frac{Total\_RBs - Control\_RBs}{RBs\_Per\_UE} \right\rfloor \times Persistence\_Interval}{\frac{Max(Retx)}{ReTx\_Interval}} \right\rfloor \times ReTx\_Interval$$

As an example, using FIG. 5's 25 Total RBs, 4 Control RBs, 20 msec persistence interval, 5 maximum retransmissions, and 3 msec retransmission interval, the VoIP capacity may be determined to be 32 UEs. Accordingly, this allocation scheme can increase the capacity of the VoIP even further than the persistent transmission, changing retransmission allocation scheme described above with respect to FIG. 4.

Figure 6:
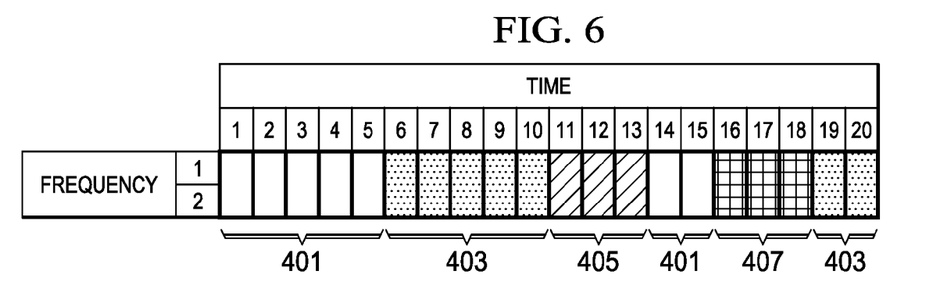
FIG. 6 illustrates a resource block diagram illustrating an early termination scheme in accordance with an embodiment of the present invention.

FIG. 6 illustrates another embodiment of the present invention in which an early termination of retransmissions is utilized. When a number of UEs 101, such as the five UEs 101 shown transmitting first transmissions 401 in time slots 1-5 of FIG. 6, begin transmitting their packets of information, one or more of the UEs 101 may successfully complete their transmission sooner than the remainder. In the example shown in FIG. 6, the five UEs 101 that transmit first transmissions 401 in time slots 1-5 also transmit second transmissions 403 (e.g., retransmissions of the first transmissions 401) in time slots 6-10. However, two of the UEs 101 successfully transmit their packets of information with the second transmissions 403, thereby opening up their time slots in the next round of transmissions. As such, in time slots 11-15, three of the original UEs 101 (those that transmitted first transmissions 401 in time slots 1-5), will transmit third transmissions 405 in time slots 11-13, and two new UEs 101 can begin their first transmissions 401 in time slots 14-15. In doing so, the overall capacity of the network 100 may be increased.

Figure 7:
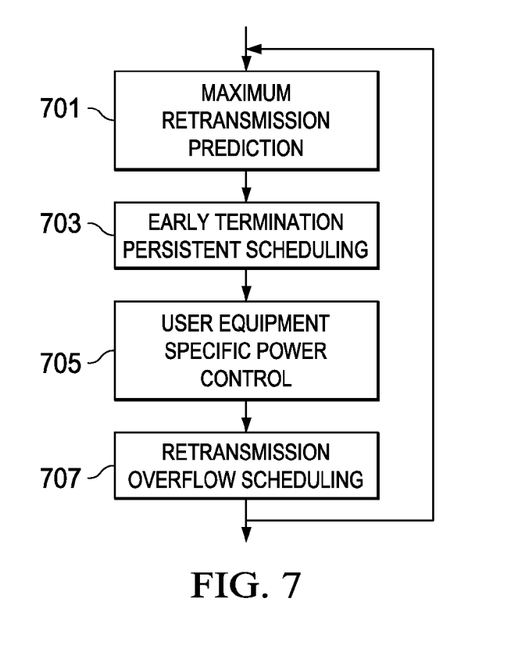
FIG. 7 illustrates a flow diagram for the implementation of the early termination procedure in accordance with an embodiment of the present invention.

FIG. 7 illustrates a flow chart to incorporate such an early termination procedure into the scheduling of the UEs 101 associated with the BTS 103. This early termination method may be utilized either with the methods described above with respect to FIGS. 1-5 or else independently from those methods, although a larger capacity may be achieved when these methods are used in conjunction with each other.

The flow chart of FIG. 7 incorporates an early termination process built into the persistent allocation scheduling algorithm of the BTS 103, instead of the more normal method of looking for UE 101 specific unused resources using the PDCCH for UEs 101 with a low number of retransmissions. Normally, because persistent scheduling uses predefined RBs, if an original transmission is successful, RBs that are already pre-defined remain assigned to that UE 101, and are essentially wasted after the transmission has been successfully received by the BTS 103. However, if some of the UEs 101 may be classified as early termination UEs 101, then these UEs 101 may be assigned a lower number of maximum retransmissions, thereby freeing up those RBs that would have been assigned to the early termination UEs 101. The freed up RBs may then be reassigned, thereby increasing the available RBs and, eventually, the overall capacity of the VoIP system.

For example, if a given RB diagram has 25 total channels, and all of the UEs 101 have a maximum of six transmission (1 original transmission and 5 retransmissions), then the system can only sustain a total of 32 UEs 101. However, if 40% of the UEs can be limited to only three transmissions (1 original transmission and 2 retransmissions), then the RBs freed up by this limitation may be used to accommodate eight more UEs, for a total of 40 UEs utilizing the same frequency bands. Further, if 8% of the UEs can be limited to a single transmission, 35% of the UEs can be limited to two transmissions, 26% of the UEs can be limited to three transmissions, 17% of the UEs can be limited to four transmissions, 7% of the UEs can be limited to five transmissions, and only 3% of the UEs have the unlimited maximum number of six transmissions, the capacity can be increased to 80 total UEs. Accordingly, early termination processes can supply a much higher capacity to handle UEs than processes without early termination.

As such, FIG. 7 illustrates a decision tree to institute the early termination process on a persistent scheduling scheme. In step 701 a prediction is made of the dispersion of maximum retransmissions that will be allowed. This prediction may be made using an ACK monitor inserted into the BTS 103, which monitors the ACK messages sent by the BTS 103 to the various UEs 101, and, from an average number of ACK messages monitored over a period of, for example, 10 persistent transmissions or 2 seconds, can predict a maximum number of retransmissions that each of the separate UEs 101 may need. For example, if the ACK monitor registers that an individual UE 101 has an average of two retransmissions (for a total of three transmissions) before the BTS 103 sends an ACK message, the BTS 103 may reassign the UE 101 to have an early termination maximum number of retransmissions to three retransmissions.

However, the present invention is not limited to using only an ACK monitor to help predict which UEs 101 are candidates for an early termination reduction of maximum transmissions. Alternatively, a monitor at a higher level than an ACK monitor, such as cyclical redundancy check OK (CRC-OK), may be utilized to monitor the performance of each UE 101 and determine which may be reduced using early termination. Also, a signal to noise ratio report may be generated and the results compared with a look up table to determine which UEs 101 may have their maximum number of retransmissions reduced without affecting the overall user experience.

In step 703 the early termination procedure is implemented into the persistent scheduling scheme by assigning certain ones of the UEs 101 as early termination UEs 101. Additionally, the early termination UEs 101 are preferably assigned a certain number of maximum retransmissions which are less than the maximum number of retransmissions for the non-early termination UEs. For example, in a network 100 that can support a total of six maximum transmissions for all UEs 101, non-early termination UEs 101 may still have six transmissions while early termination UEs 101 may be assigned a maximum number of transmissions between 1 and 5, such as 3 transmissions. Preferably, although not required, the reduced number of retransmissions are a factor of the number of maximum transmissions. For example, if the network 100 has a maximum number of six retransmissions, then the early termination UEs 101 are preferably set to have a maximum number of retransmissions that are a factor of six, such as a maximum number of either two or three retransmissions. This helps to simplify the scheduling of the transmissions and retransmissions for all of the UEs 101.

In step 705, once the early termination UEs 101 are identified and assigned their maximum number of retransmissions, the power controls of each of the early termination UEs 101 are preferably modified to help ensure that the BTS 103 successfully receives the packets of information sent by the early termination UEs 101. However, because the more power that is used by each UE 101 generates larger interference with other signals sent by other UEs 101, the maximum power used by each early termination UE 101 is preferably optimized to use just as much power as required to successfully send the signal to the BTS 103.

As such, a UE centric optimized power boost is preferred. This UE centric power boost may be performed immediately upon being assigned as an early termination UE (if a slow changing power control system is utilized) or else may be phased in if subsequent retransmissions are unsuccessful, such as on a final retransmission of the UE 101. As an example, the specific power control of each UE may be given by the equation:

$$P_{tx} = \min\{P_{MAX}, P_O + \alpha PL + f(i)\}$$

Where $P_{tx}$ is the power of the transmission;
$P_{MAX}$ is a maximum power available to the UE;
$P_O$ is a power level that the BTS 103 desires to receive the UE's signal, and which is preferably set to maximize the number of UEs 101 while keeping (S/N) Target—IOT (interference over thermal noise)+10 log10(6)>1;
$\alpha$ is a cell specific path loss compensation factor (which can be set to one to allow full path loss compensation);
PL is a downlink pathloss; and
f(i) is a closed loop power control factor.

Preferably, for the early termination procedure, for those UEs 101 that are assigned as early termination UEs 101, $\alpha$ is preferably set to 0.5 and the corresponding Po from the BTS 103 is preferably raised to, for example, −78 dBM. Additionally, center UEs 207 (see FIG. 2) are preferably assigned a higher SINR threshold. By using this method, the UE specific power commands help to ensure performance of the early termination UEs 101 in the persistent scheduling scheme.

Finally, in step 707, any early termination UEs 101 that fail to successfully send the packet of information within the assigned maximum number of transmissions, and thus overflow the reduced maximum number of transmissions, will need to reschedule the transmission of the packet of information. This rescheduling may be performed dynamically using the resources remaining after all of the scheduled transmissions and retransmissions. For example, the BTS 103 may schedule a resource to handle the overflow transmission from a UE 101 with a high SINR coupled with the longest delay from the original transmission.

Alternatively, the rescheduling may be performed by rescheduling the early termination UE 101 to again resend the packet of information as a new packet of information, with the early termination UE 101 subject to the same early termination, reduced number of maximum transmissions. Alternatively, the early termination UE 101 may be reassigned to be a non-early termination UE 101, such that it has the maximum number of retransmissions allowed, and then the UE 101 may be rescheduled to send the packet of information.

By implementing an early termination scheme as described above, a persistent scheduler can realize an increase in capacity of the VoIP network 100. For example, a standard persistent scheduler may be able to schedule 32 individual UEs 101 without early termination. However, by implementing early termination, the capacity of the VoIP network 100 may be increased to being able to handle 40 UEs 101, or a greater than 30% increase in capacity.

As yet another enhancement of the early termination procedure for persistent scheduling, each of the UEs 101 may be initially assigned a temporary maximum number of transmissions that is less than the maximum number of retransmissions supported by the network 100. Then, utilizing, for example, the ACK monitor, each of the UEs 101 is monitored to determine which ones may be reduced to an even lower number of maximum transmissions, and which ones require a larger number of maximum transmissions. Those UEs 101 which may be reduced are reassigned as early termination UEs 101 according to the early termination routine as described above. Those UEs 101 which may require a larger number of retranmissions are scheduled using TTI bundling wherein the UEs 101 are allocated consecutive time slots. Alternatively, the extra transmissions may be allocated dynamically using the PDCCH.

As another optimization scheme, which may be utilized either by itself as a stand-alone optimization or else used along with the scheduling and early termination schemes described above, an Uplink Multiuser Multiple Input Multiple Output (MU-MIMO) spatial scheduler may be utilized to extend the capacity of the VoIP system. Using a MU-MIMO spatial scheduler, multiple UEs 101 may be paired together and then scheduled to uplink in the same time-frequency resource, and a traditional MIMO receiver may be utilized to separate the individual signals from the separate UEs 101 at the BTS 103.

This pairing may be performed using, for example, uplink space division multiple access (SDMA) which utilizes the separability of the spatial signatures at the BTS 103 antennas to separate the UEs 101. Alternatively, variants of space-time coding, which utilize multiple antennas to decode the spatial diversity between two different signals can be used. SDMA and space-time coding, however, are merely two of the potential ways to separate individual signals in a MU-MIMO, and are not meant to limit the present invention. Any suitable technology may be used to spatially combine and separate different transmissions, such as, spatial multiplexing, receive beamforming, combinations of these, or the like, may alternatively be utilized.

Such pairing may be performed based upon one or more multiple pairing methods. For example, in a random MU-MIMO (MIMO-RND) pairing, any two UEs 101 within range of the BTS 103 are selected and paired at random. However, while entirely usable, this type of pairing can cause edge UEs or UEs that are HARQ limited to be paired, which may have a detrimental effect on their ability to successfully transmit packets of information to the BTS 103.

As an improvement to the MIMO-RND procedure, a single user receiver, for example the maximum ratio combining (MRC) can be combined with the MIMO-RND procedure for an MRC and random MU-MIMO pairing (MRC-MIMO-RND). In this approach, UEs that are performing well, such as center UEs 207 may still be paired randomly. However, poorly performing UEs, such as edge UEs 205 are not paired but are, instead, scheduled using a single user receiver such as, for example, an MRC, MMSE, or IRC.

However, while center UEs 207 and edge UEs 205 may be used as the metric for determining which UEs 101 should be paired together, this is not the only metric that may be used. For example, UEs 101 having a low geometry (e.g., the long term channel characteristics characterized by path loss and shadowing components of the channel are large), such as users with geometry below the 20$^{th}$ percentile, may be scheduled using an MRC routine while UEs 101 having a high geometry, such as about the users above the 20$^{th}$ percentile may be paired together. Alternatively, UEs 101 having a low Signal to Interference and Noise Ratio (SINR) such as about 3 dB, and characterized by a low channel quality indicator (CQI), may be scheduled using an MRC scheme while UEs 101 with a high SINR (>3 dB) and characterized by a high CQI, may be paired together. Any suitable metric may be utilized to determine which UEs 101 should be paired together.

However, if no random pairing is desired at all, an intelligent pairing that pairs the UEs 101 based on the relationship between the spatial channels (for example, their orthogonality) may be utilized. An example is the orthogonal MU-MIMO (MIMO-ORTH) pairing. In this pairing the UEs 101 to be paired are selected based upon some desired metric, such as a metric that emphasizes the spatial separability, and hence, the decodability, of the signals over the allocated resources. For example, a mean "inner-product" of the UE channels, such as the Fubini distance, may be used as the metric to determine which UEs 101 are best paired together, although any other suitable metric, such as the effective SINR of each UE 101 after decoding (a decoder specific metric) or the behavior of their traffic, may alternatively be utilized. For example, if the two UEs 101 in the voice conversation are in the same cell, the BTS 103 can assign both UEs 101 to the same resource, knowing that statistically, one UE 101 will be quiet when the second UE 101 has traffic to send.

However, while orthogonal pairing removes any randomness from the pairings, it may not, by itself, be the best method of pairing in every circumstance. As such, the orthogonal pairing may be combined with the MRC scheme described above with respect to the MRC-MIMO-RND process. In this process, poorly performing UEs, such as edge UEs 205 are scheduled using the MRC scheme. Good performing UEs 101, such as center UEs 207, may then be paired using an orthogonal pairing, such as the mean Fubini-distance.

Lastly, but not limiting, the UEs 101 may be paired based upon a metric to optimize the performance of the BTS 103 that receives the signals sent by the UEs. For example, the effective SINRs of both UEs 101 after separation by the BTS 103 receiver may be used to determine the pairings in order to optimize the performance of the BTS 103, although any suitable optimization pairing may alternatively be utilized. As another example, a BTS 103 that comprises an advanced receiver may be able to pair UEs 101 that a less advanced received would not be able to pair. As such, each BTS 103 may be optimized for its own individual performance metrics in order to obtain an optimized performance.

In an embodiment of the present invention, the MU-MIMO scheduling schemes described above may be utilized along with non-MIMO scheduling schemes (wherein each UE 101 is assigned a specific RB by itself) to increase the capacity of the VoIP system. In an embodiment, the edge UEs 205 may be scheduled using a non-MIMO scheme wherein each UE 101 has an independent frequency band to utilize for the transmission of the packets of information. This allows the edge UEs 205, which typically have a smaller chance of their signal being successfully received by the BTS 103, their own independent frequency band instead of pairing the edge UE 205 and potentially decreasing the chances of a successful transmission.

In this embodiment, however, the center UEs 207 are preferably scheduled using one of the MIMO pairing schemes described above. For example, while the edge UEs 205 may be scheduled to have a single frequency band, the center UEs 207 may be paired together using, for example, the MRC-MIMO-ORTH or the MRC-MIMO-RND pairing schemes as described above. Because the center UEs 207 have a lower signal-to-noise ratio, there is higher probability that the packets of information from the center UEs 207 will be successfully received by the BTS 103, and pairing of the center UEs 207 using one of the MIMO schemes will be less likely to affect the successful transmission while also increasing the capacity of the system.

By using a non-MIMO scheduling scheme for the edge UEs 205 and a MIMO scheduling scheme for the center UEs 207, those UEs 101 that may be paired together without a large corresponding degradation of the system are paired together. Conversely, those UEs 101 that will suffer from being paired together are scheduled such that they each have their own frequency band, thereby maximizing their potential to successfully transmit their packet of information. As such, the capacity of the network 100 can be maximized without a corresponding reduction of successful transmissions.

In another embodiment the non-MIMO/MIMO scheduling routine may be used in conjunction with the early termination scheduling described above with respect to FIGS. 6 and 7. In this embodiment, the center UEs 207 are not only paired with another UE 101 in a MIMO scheduling scheme, but they are also subjected to the early termination scheme, whereby those UEs 101 that can have their maximum number of retransmissions reduced. Additionally, those ones of the center UEs 207 that have their maximum number of retransmissions reduced preferably also have their power boosted as described above in order to help ensure a successful transmission.

In yet another embodiment that pairs the non-MIMO/MIMO scheduling routine with the early termination routine, the MU-MIMO and early termination designations can be performed separately from each other. In this method the early termination procedure may be used to select UEs 101 to be assigned as early termination UEs 101 independently of whether they are edge UEs 205 or center UEs 207. Once the early termination UEs 101 are designated, the remainder of the UEs 101 (those that are not designated as an early termination UEs 101) may be combined using a MIMO scheduling routine, as described above.

In an alternative embodiment, those UEs 101 that are designated as non-termination UEs 101 may be split into edge UEs 205 and center UEs 207. Once split, those center UEs 207 that are also designated as non-early termination UEs 101 may be paired using a MIMO scheduling routine, while edge UEs 205 are scheduled using a non-MIMO scheduling routine into their own frequency band. Such a pairing helps to incorporate all of the benefits from both the early termination scheduling and the MIMO scheduling to increase the capacity of the network 100.

By incorporating the MU-MIMO scheduling schemes into the persistent scheduling scheme, that capacity of the VoIP network 100 may be increased from the baseline of 32 UEs to greater than 40 individual UEs. Additionally, if the MU-MIMO scheduling schemes are utilized along with the early termination schemes as described above, an even larger increase of greater than 48 individual UEs may be realized. These capacity increases can lead to a direct improvement in the overall VoIP network 100.

In another embodiment, a semi-persistent scheduling scheme may be utilized for VoIP transmissions through the network 100. In the semi-persistent scheduling routine a UE's 101 original transmission is transmitted in a pre-defined RB (similar to the persistent scheduling), but the retransmissions are allocated dynamically just before each re-transmission. Historically, this dynamic allocation has been performed using the BTS 103 to schedule the time and frequency for the UE 101 to retransmit the packet of information and to send this feedback signal to the individual UEs 101. However, this process includes a large overhead of information for both the time and frequency of the response, as well as only allowing a single signal to be sent for each of the UEs 101 that failed to successfully transmit their packets of information.

In an alternative embodiment of a semi-persistent scheduling scheme, both the original transmission and the first retransmission are transmitted in pre-defined RBs while the remainder of the retransmissions are dynamically allocated just before the re-transmissions. In this embodiment the first retransmission is preferably fixed in a separate frequency band than the original transmission.

In another embodiment of the present invention utilizing the semi-persistent scheduling scheme, the feedback signal sent from the BTS 103 to the individual UEs 101, such as the HARQ signal (see FIG. 3) preferably only carries a resource location, such as which frequency band to use, instead of having to carry both the resource location as well as the time for which each UE 101 is scheduled to use for the each retransmission. To facilitate this, the individual UEs 101 are preferably assigned a pre-determined number of subframes to which they retransmit following an event, such as four subframes after either a persistent allocation (e.g., the original transmission) or else after receiving a NAK signal from the BTS 103.

By assigning each UE 101 a pre-determined number of subframes to retransmit, the BTS 103 can better handle the inevitable collisions that occur by simply changing the frequency bands of one of the signals involved in the collision. For example, if an original transmission is originally scheduled to collide with a retransmission from, for example, two separate UEs 101, the BTS 103, using the feedback packet, may switch the resource for the original first transmission such that the first transmission is sent along a separate frequency band, thereby avoiding the collision in the same resource. Alternatively, the BTS 103 may switch the retransmission into the separate resource such that the retransmission, instead of the original transmission, is transmitted in the switched resource. Such a scheduling helps to prevent collisions during transmission.

By shortening the length of the feedback signal, less time is necessary to transmit the feedback signal to the individual UEs 101. Additionally, by removing the timing from the feedback signal, multiple UEs 101 can be addressed in a single feedback packet, allowing for an even larger capacity, as fewer feedback signals are required the signal multiple UEs 101 to retransmit.

Additionally, the early termination scheme may be incorporated into this BTS 103 scheduling. In this embodiment the early termination scheme would be used to predict and assign UEs 101 an appropriate number of maximum retransmissions, thereby freeing up later resources that would have been unused. Additionally, and as described above, the early termination procedure would also use a power boost in order to increase the effectiveness of transmissions from the early termination UEs 101. This scheme would help to reduce the number of scheduled collisions, and any remaining collisions could be handled using the resource location feedback signal as described.

In yet another embodiment, a single MIMO scheduler or combination of MIMO schedulers may be utilized with a semi-persistent scheduling scheme in order to maximize the Carrier to Interference and Noise Ratio (CINR). In this embodiment, the BTS 103 may utilize a first spatial scheduler for the original, persistent transmission, and utilizes a second spatial scheduler for the retransmissions. By using separate spatial schedulers, different types of MIMO scheduling may be performed on the original, persistent transmission and the retransmissions.

For example, in an embodiment a single MIMO scheduler may be used to schedule resource locations for the original transmissions and the retransmissions. Alternatively, a first spatial scheduler may schedule the original transmission preferably using any of the MRC-MIMO schedulers described above, such as MRC-MIMO-RND. The second spatial scheduler, however, may use a non-MRC, MIMO scheduling scheme, such as MIMO-RND or MIMO-ORTH. In yet another alternative embodiment, the UEs 101 may be split into center UEs 207 and edge UEs 205, with the center UEs 207 being scheduled by the first spatial scheduler using a first type of MIMO scheduling scheme while the edge UEs 205 may be scheduled by the second spatial scheduler using a second type of MIMO scheduling scheme.

Using these two separate spatial schedulers, the overall capacity of the system may be improved. For example, using a semi-persistent scheduler wherein the original transmission is scheduled using a MRC-MIMO-RND schedule and the retransmissions are scheduled using a MIMO-RND schedule, the total capacity can be increased to 150 UEs from the standard baseline of 80 UEs (or even the increased 130 UEs that may be obtained with a single spatial scheduler scheduling MIMO-RND for each transmission).

Although the present invention and its advantages have been described in detail, it should be understood that various changes, substitutions and alterations can be made herein without departing from the spirit and scope of the invention as defined by the appended claims. For example, many of the techniques disclosed herein may be utilized separately from the other techniques, or else these techniques may be combined together as discussed to achieve an even greater improvement to the capacity of the VoIP network.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for scheduling VoIP signals, the method comprising:
scheduling a transmission of a first packet of VoIP information;
scheduling a retransmission of the first packet of VoIP information, wherein a first one of the transmission of the first packet of VoIP information or the retransmission of the first packet of VoIP information is scheduled along a pre-defined resource and a second one of the transmission of the first packet of VoIP information or the retransmission of the first packet of VoIP information different from the first one of the first packet of VoIP information is scheduled along a changing, defined resource, wherein the pre-defined resource and the changing, defined resource are frequency-time resource blocks and wherein the scheduled along the changing, defined resource comprises changing a frequency band;

scheduling a transmission of a second packet of VoIP information different from the first packet of VoIP information, wherein the first packet of VoIP information and the second packet of VoIP information are transmitted from a same source; and scheduling a retransmission of the second packet of VoIP information, wherein a first one of the transmission of the second packet of VoIP information or the retransmission of the second packet of VoIP information is scheduled along the pre-defined resource.

2. The method of claim 1, wherein the transmission is scheduled along the pre-defined resource and the retransmission is scheduled along the changing, defined resource.

3. The method of claim 1, wherein the transmission is scheduled along the changing, defined resource and the retransmission is scheduled along the pre-defined resource.

4. The method of claim 3, wherein the pre-defined resource is defined as the resource used by the transmission.

5. The method of claim 1, further comprising assigning a first maximum number of times that the first packet of VoIP information may be scheduled for retransmission, the first maximum number of times being less than a total maximum number of times that the first packet of VoIP information may be scheduled.

6. A method for scheduling VoIP signals, the method comprising:

scheduling a first user equipment into a frequency band by itself; and scheduling a second user equipment and a third user equipment into a single frequency band, wherein the first user equipment, the second user equipment, and the third user equipment are all transmitting to a single base station;

assigning a first maximum number of retransmissions for each of the first user equipment, the second user equipment, and the third user equipment;

predicting whether each of the first user equipment, the second user equipment, and the third user equipment will utilize each of the maximum number of retransmissions; and assigning a second maximum number of retransmissions to at least one of the first user equipment, the second user equipment, or the third user equipment, the second maximum number of retransmissions being less than the first maximum number of retransmissions.

7. The method of claim 6, wherein the first user equipment is an edge user equipment and the second user equipment is a center user equipment.

8. The method of claim 6, further comprising assigning a fourth user equipment a reduced number of maximum transmissions prior to scheduling the first user equipment, the second user equipment, and the third user equipment.

9. A method for scheduling VoIP signals, the method comprising:

scheduling a transmission of a first packet of VoIP information from a first user equipment in a semi-persistent scheduling scheme;

assigning the first user equipment a defined time period in which to retransmit; and sending a feedback signal to the first user equipment after failing to receive the first packet of VoIP information, wherein the failing to receive the first packet of VoIP information occurs after the first packet of VoIP information has been sent from the first user equipment, the feedback signal including information on a resource to be used to avoid collisions but not including the time period in which to retransmit, wherein the information on the resource comprises a frequency band.

10. The method of claim 9, wherein the feedback signal carries information for the first user equipment and a second user equipment.

* * * * *